(12) United States Patent
Crane et al.

(10) Patent No.: US 6,202,028 B1
(45) Date of Patent: Mar. 13, 2001

(54) VARIABLE TORQUE RATE SIMULATED TEST JOINT

(75) Inventors: David O. Crane, Lutterworth; Hedley L. Quinton, Castle Donington, both of (GB)

(73) Assignee: Crane Electronics Ltd., Leicestershire (GB)

( * ) Notice: Subject to any disclaimer, the term of this patent is extended or adjusted under 35 U.S.C. 154(b) by 0 days.

(21) Appl. No.: 09/261,536

(22) Filed: Mar. 3, 1999

Related U.S. Application Data

(63) Continuation of application No. PCT/GB97/02375, filed on Sep. 5, 1997.

(30) Foreign Application Priority Data

Sep. 5, 1996 (GB) .................................. 9618408
Jul. 1, 1997 (GB) .................................. 9713806

(51) Int. Cl.[7] .................................................. G01L 3/00
(52) U.S. Cl. ............................. 702/43; 702/41; 702/42; 73/862.08; 73/862.23
(58) Field of Search ................... 702/33, 41, 42, 702/43; 73/862.08, 862.12, 862.21, 862.23, 862.24; 303/141, 155, 167

(56) References Cited

U.S. PATENT DOCUMENTS

| | | | |
|---|---|---|---|
| 3,981,545 | * | 9/1976 | Eddy ..................................... 303/139 |
| 4,062,233 | * | 12/1977 | Bonomo ............................. 73/862.14 |
| 4,150,559 | * | 4/1979 | Levy ................................... 73/862.12 |
| 4,669,045 | * | 5/1987 | Kubo ..................................... 702/141 |
| 4,762,007 | * | 8/1988 | Gasperi et al. ................. 73/862.326 |
| 5,624,164 | * | 4/1997 | Tozu et al. ........................ 303/113.5 |

OTHER PUBLICATIONS

PCT Written Opinion dated Jun. 10, 1998, Int'l. Appl. No. PCT/GB97/02375.
PCT Written Opinion dated Aug. 27, 1998, Int'l. Appl. No. PCT/GB97/02375.

* cited by examiner

*Primary Examiner*—Marc S. Hoff
*Assistant Examiner*—Bryan Bui
(74) *Attorney, Agent, or Firm*—Marshall, O'Toole, Gerstein, Murray & Borun

(57) ABSTRACT

A variable rate test joint comprises a housing and a shaft mounted within the housing. A hexagonal head is provided for coupling a tool to be tested to the shaft. In use a frictional braking torque is applied to the shaft. A computer controls the magnitude of the braking torque applied to the shaft as a function of time.

18 Claims, 15 Drawing Sheets

VARIABLE TORQUE RATE SIMULATED TEST JOINT

This is a continuation of International Application No. PCT/GB97/02375, filed Sep. 5, 1997.

DESCRIPTION

1. Field of the Invention

The invention relates to calibration equipment for testing the accuracy and consistency of rotary power assembly tools for threaded fasteners, and provides a variable torque rate simulated test joint against which such rotary power assembly tools can be tested.

2. Background Art

Rotary power assembly tools for the application of torque to screw-threaded fasteners can include power screwdrivers, torque wrenches, pneumatic nutrunners and hydraulic impulse tools. Power screwdrivers tend to be used for the more lightweight applications where the torque to be applied is only a few N.m (Newton.Meters), whereas torque wrenches and hydraulic impulse tools are used to deliver torques of up to 150 N.m or even above. Hydraulic impulse tools are becoming progressively more widely used for production line assembly work, since they are torque-absorbing in the sense that they do not require the operator to exert a significant counter-torque to prevent tool movement, and are generally faster and more convenient to use than torque wrenches. There is however no calibration equipment commercially available against which all such tools can periodically be checked to ensure consistency of torque application in the resulting joints.

In an assembly production line, for example, a worker may be using the same rotary power assembly tool for tightening large numbers of threaded bolts to a predefined torque. That predefined torque is set into the rotary power assembly tool but the setting could vary over time as the tool is subjected to heavy use. A simulated test joint is therefore provided, against which the rotary power assembly tool can be tested periodically to ensure that it is not in need of maintenance or adjustment. Generally the test joint is designed to mimic in a known repeatable way the behaviour of an idealized real joint. This allows the performance of the tool to be gauged accurately.

Real joints do not all have the same "Torque Rate". "Torque Rate" is defined in ISO 5393 as the "increase in torque with angular displacement while advancing a fastener in a threaded joint". In other words, if an increase in applied torque of $\Delta\tau$ results in an increase in the angular displacement of a threaded fastener of $\Delta\alpha$, torque rate is the ratio $\Delta\tau/\Delta\alpha$. The threaded joint may be a hard joint or a soft joint, of which hard joints have the higher torque-rates. Consequently, in order to test a power tool in circumstances which mimic those encountered in reality, test joints are available which have variable torque settings and variable torque rate settings. ISO 5393 is the International Standard relating to test joints and it defines, for non-impact wrenches, specifications for the $\Delta\tau/\Delta\alpha$ relationship for hard (high [H] torque-rate) and soft (low [L] torque-rate) joints. These specifications are intended to represent the two ends of the range of hard and soft joints encountered in normal usage of a power tool.

DE-C-3305457 discloses a variable torque rate simulated test joint for a rotary power assembly tool which applies torque continuously. The tool is used to apply torque to a shaft which rotates against a magnetic brake. The braking force is increased until the shaft stops. Torque and angle are monitored repeatedly or continuously during braking. A microprocessor compares the torque and angle values and controls the braking force as a function of the measured angle, such that the ratio of torque to angle has a specifiable constant value. The use of an angle feedback ensures that the simulated test joint can comply with ISO 5393.

The simulated test joint of DE-C-3305457 is not suitable for use with hydraulic impulse tools or with any other pulse or impact operated power assembly tool.

GB-A-2038006 discloses an apparatus for checking and adjusting a power screwdriver to a predetermined tightening torque. The apparatus comprises a purpose-designed simulated joint specific to the screwdriver to be adjusted, and comprises a disc brake straddled by brake calipers of the kind used in motor car braking systems. The choice and design of components in GB-A-2038006 is such as to teach the reader that the inertia of the components is immaterial. High inertia components are used in the illustrated preferred embodiment, and there is no appreciation in the teaching of GB-A-2038006 that the device may be capable of broader utilization if the basic design elements of the apparatus were discarded and the apparatus redesigned to achieve minimum inertia. Indeed there is no appreciation that a low inertia friction brake achieving the necessary torque levels is achievable, or that it would be useful.

In a hydraulic impulse tool a flywheel is accelerated to build up its energy store over a very short period, of the order of 10 to 30 milliseconds, during which period no output torque is delivered. There is then a momentary transfer of that accumulated energy, as an impulse, to the joint or simulated joint. During that transfer the output torque delivered rises from zero to its maximum value and falls back again to zero over a very short space of time, typically from 1 to 10 milliseconds. Moreover during use of a hydraulic impulse tool the angular movement of the joint components per impulse of the tool varies, and the rate of pulsing of the tool also varies. Thus no monitoring of torque rate and angle as in DE-C-3305457 could possibly give rise to a meaningful or sufficiently fast and responsive control of brake application in a simulated test joint used in conjunction with a hydraulic impulse tool. There is no way at all that an apparatus according to GB-A-2038006 could have any significant use with a hydraulic impulse tool.

Further, it has been realized by the Applicants that the apparatus of DE-C-3305457 could not possibly be used as a test joint for a pulse tool even if used in a different way to that claimed in DE-C-3305457. DE-C-3305457 applies its variable torque by means of an electromagnetic brake which brakes a shaft coupled to the nutrunner of the device. The inventors of this apparatus considered it to have a low inertia and indeed when testing non-pulse tools its inertia can be regarded as virtually negligible. However, the Applicants have discovered that inertia is extremely significant when testing pulse tools, as discussed later. The inertia of the apparatus of DE-C-3305457 would be high enough to make it totally unsuitable for the purpose. The inertia of the apparatus of GB-A-2038006 is several orders of magnitude higher still.

U.S. Pat. No. 4150559 discloses a variable rate joint suitable for calibration of a power angle wrench or nutrunner, in which the joint rate can be selected between a hard joint and a soft joint by actuating one or other of a pair of electromagretic valves to direct pressurized control air to a disc brake mechanism. The valves direct the air through alternative passages one of which incorporates a flow restrictor to slow down the brake actuation for the sofe joint simulation. The apparatus is totally unsuitable for use with impulse tools which are not even considered in U.S. Pat. No. 4150559.

THE INVENTION

The invention provides a variable rate test joint comprising:
 a housing;
 a shaft mounted within the housing;
 means for coupling a tool to be tested to the shaft; and
 brake means for applying a braking torque to the shaft; characterized in that
  the brake means comprises
   a brake shoe assembly actuable by electrohydraulic or electropneumatic means and being arranged to act in use directly on the outer cylindrical surface of the shaft to apply a frictional braking torque thereto; and
   a computer for controlling the pressure applied to the electrohydraulic or electropneumatic means as a function of time, being arranged to vary in use the applied pressure from a preset threshold to a maximum value over a time period which is variable to reflect the hardness of the joint being simulated.

Because frictional means are used to brake the shaft, it can be of small outside diameter. It can also be the sole rotating element (apart from bearings). Thus the rotating parts can maintain an extremely low inertia (preferably less than $10^{-4}$ kg/m$^2$), making the apparatus suitable for use with pulse tools. Ideally the moment of inertia of the simulated test joint should be of the same order of magnitude as that of the joint being simulated. There are ISO standards that describe the dimensional tolerances for all types of bolts, including hexagon headed bolts. Although there are a number of different suppliers offering sockets for connecting power tools to fasteners, the sizes of the different sockets are remarkably similar. Therefore it is possible to calculate the polar moment of inertia for the entire system of a nut or bolt and the appropriate socket, For bolts, it is possible to look up the shortest standard bolt and the longest standard bolt and compute the range of consequent additional inertia. This range has been found to be less than plus or minus 5% from an average bolt length and therefore of little significance. Moments of inertia can thus be calculated for each size of nut or bolt and the inertia of the simulated test joint compared to these.

For example, if the joint being simulated is an M10 bolt with an axial length of 2 cm, then the moment of inertia of the simulated joint should be of the same order of magnitude as that M10 bolt. In order for the same apparatus to simulate a variety of joints it is possible to employ a range of interchangeable coupling heads (not illustrated) to connect onto the top end of the shaft 2, chosen to have sizes which mimic the moments of inertia of various joints to simulated.

A simulated test joint according to the invention may be provided with a range of different coupling heads, each appropriate for testing particular levels of torque. For example, a first coupling head might be used for torques up to 2 Nm. This combination of coupling head and shaft should have a moment of inertia similar to that of fasteners appropriate to these torque levels. A second coupling head may be provided for greater torques, for example up to 16 Nm. A third coupling head may be provided for even greater torques, for example up to 128 Nm. Indeed a larger number of coupling heads may be provided to mimic closely the inertia of fasteners appropriate to any particular torque. A rotatable turrent head may for example be provided above the housing to couple onto the shaft each in turn of a range of such heads. It will therefore be understood that the moment of inertia of the shaft and associated rotatable parts (bearings etc) of the brake assembly is preferably of the same order of magnitude as that of the <u>smallest</u> joint to be simulated. This can only be achieved by having the brake shoes act directly on the shaft.

The means for applying the frictional braking torque to the shaft includes electrohydraulic or electropneumatic means. These are controlled by controlling their actuation pressure using a closed loop feedback system. The actuating pressure preferably acts on a brake shoe assembly in which all shoes are independently actuated or in which the shoe or shoes on one side of the shaft are actuated and those on the other side provide simply a reaction force. Preferably the brake shoe assembly includes on its inner cylindrical surface a commercially available friction brake material.

The variable rate test joint preferably includes means for measuring the braking torque applied to the shaft and the angle through which the shaft rotates. The monitoring of these parameters is not used during operation of the variable rate test joint of the invention to simulate a joint for actual power assembly tool testing but is used during setting up, calibration and joint mapping as will be described below. It also allows confirmation that the test joint is behaving according to the ISO specification, if required.

The means for measuring the braking torque applied to the shaft may include a load cell for measuring the reaction force on the housing. However it is preferable to use an arrangement which avoids the effects of the inertia of the housing. In one such arrangement, the means for applying the braking torque is a brake shoe assembly surrounding the shaft and mounted in the housing by means of a bearing which allows the transmission of thrust but not of torque from the housing to the brake shoe assembly. Rotation of the brake shoe assembly may be prevented by one or more cantilever beams, with the beams being provided with strain gauges for measuring the reaction torque on the brake shoe assembly and thereby the torque applied to the shaft.

Means may be provided for biasing the brake shoe assembly away from contact with the shaft, to ensure that the shaft runs freely when it is not intended to apply any braking torque.

The electrohydraulic or electropneumatic means for applying the braking torque to the shaft preferably includes a piston. To allow the piston to apply force accurately at the low end of the scale, while also being able to apply high forces, it may include more than one plunger. The plungers have different thrust areas so that application of the same pressure to each plunger results in a different force applied by the plunger. Selective operation of the plungers allows fine adjustment of force at the lower ends of the scale by using only a plunger with a small thrust area while still allowing the application of higher forces by a plunger with a larger thrust area.

The invention also provides a method for testing torque application tools, the method including the steps of:
 coupling the tool to a shaft;
 applying a frictional braking torque to the shaft by the direct frictional contact of an electrohydraulically or electropneumatically actuable brake shoe assembly on the outer cylindrical surface of the shaft; and
 controlling the magnitude of the hydraulic or pneumatic control pressure acting on the brake shoe assembly to generate the frictional braking torque, using a computer to raise the applied control pressure as a function of time from an initial threshold pressure to a maximum value over a time period which has been preselected to reflect the hardness of the joint being simulated.

The use of a computer allows the application of torque to be varied according to learned characteristics of a particular tool. The preferred method of testing a tool is to carry out a series of braking operations, monitor the results from each operation and use them to refine and improve the results of future braking operations. In this way, results complying with ISO 5393 can be achieved.

Preferably, periodic calibration runs are carried out to ascertain the relationship between pressure applied to the electrohydraulic means and torque applied to the shaft.

THE DRAWINGS

Figure 1:
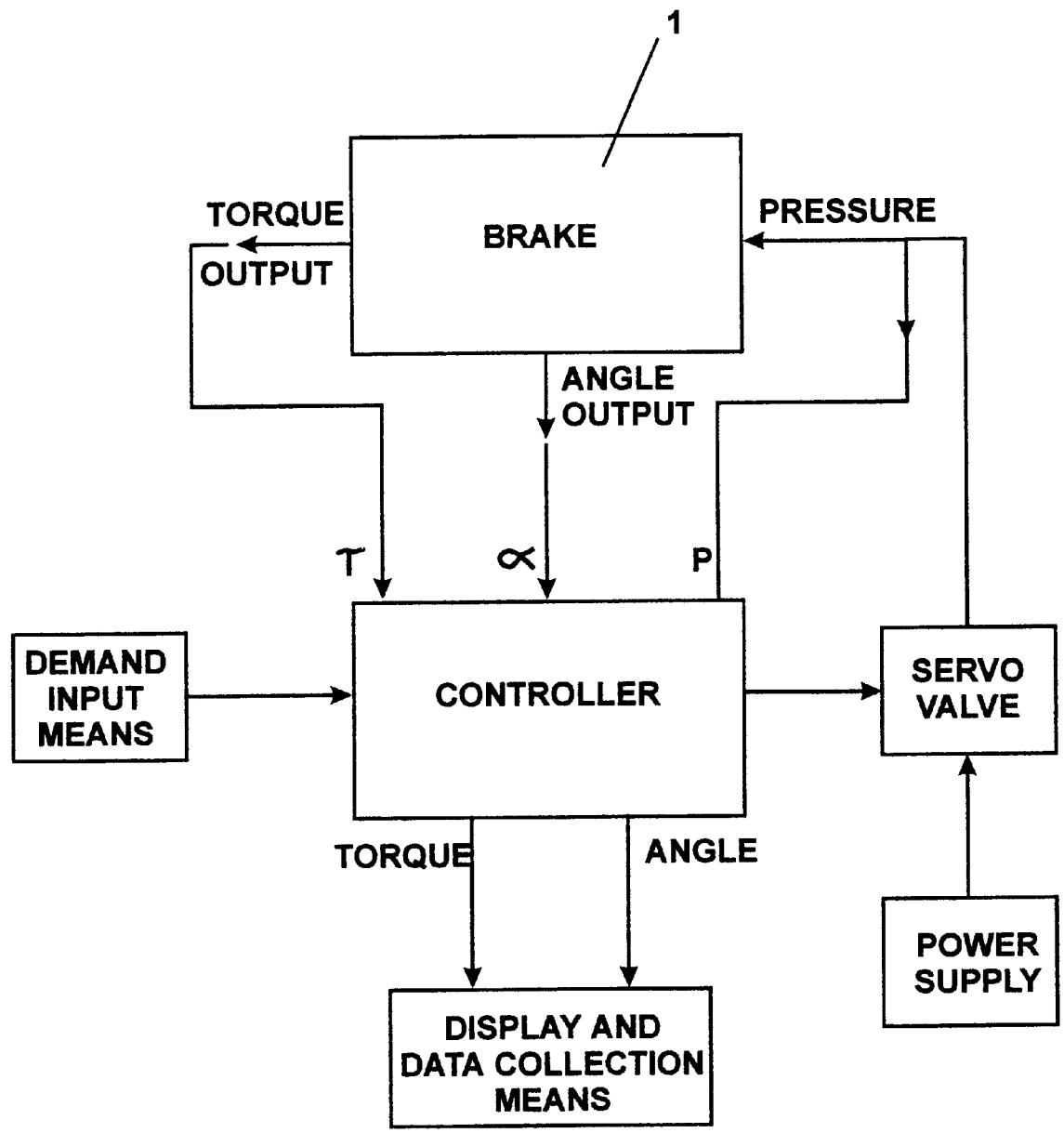
FIG. 1 is a system layout for a joint simulator according to the invention, showing the brake, and the means for monitoring and controlling its action.

Referring to FIGS. 1 to 4, a brake 1 includes a shaft 2 having an input drive 3, which may be a bolt head or a socket which can be engaged by a power tool. The shaft is received in a cylindrical hole 4 between the jaws of a phosphor bronze brake shoe assembly 5. Other friction materials would be appropriate for different torque ranges. For example, a commercial friction brake lining material has been found to be the preferred facing for the brake shoe assembly 5. The brake shoe assembly 5 is mounted within a housing comprising side and end plates 6 and upper and lower plates 7.

The jaws of the brake shoe assembly 5 are mounted within the housing such that they may slide freely towards one another, so as to grip and brake the shaft, or away from one another to release the shaft. They have a freedom of movement of approximately 3 mm.

Solidly mounted within the housing is a piston assembly 11, for controlling the force applied by the brake shoe assembly 5 to the shaft 2. A plunger 10 of the piston assembly contacts the brake shoe assembly 5 and is used to push the jaws of the brake together to brake the shaft. The force which the plunger 10 applies to the brake shoe assembly 5 depends on the pressure P of oil forced into the piston assembly 11. In order that this force is highly controllable even at the lower end of the pressure range, the piston assembly 11 includes a miniature plunger 19 mounted within the main plunger 10.

Operation of the double plunger piston assembly is explained with reference to FIG. 7, which is a schematic representation of the piston assembly 11.

Figure 7:
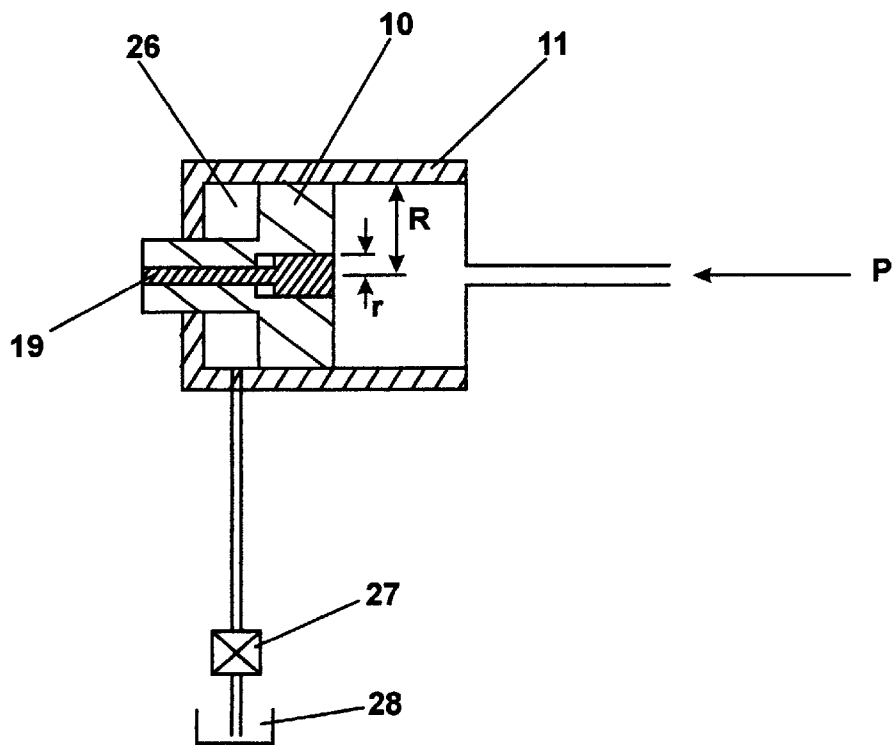
FIG. 7 is a schematic cross section of a piston device suitable for use in a simulated joint according to the invention.

Referring to FIG. 7, the piston assembly 11 includes an oil filled gap 26 connected via a valve 27 to a reservoir 28. When the valve 27 is open, oil can flow freely out of the gap 26 when the main plunger 10 moves to the left as shown in the figure. When the main plunger 10 moves to the right as shown in the figure, the oil is drawn back into the gap 26. Thus, the application of an oil pressure P to the piston results in the movement of the main plunger 10 to the left. The force applied by the main plunger 10 to the brake is $P \times \pi R^2$ where R is radius of the thrust area of the main plunger 10.

When the valve 27 is shut, oil is trapped in the gap 26. When a pressure P is applied to the piston, the main plunger 10 cannot move (the compressibility of oil being virtually negligible). Therefore the miniature plunger 19 is forced to move to the left in the figure. The force applied by the miniature plunger 19 to the brake is $P \times \pi r^2$ where r is the radius of the thrust area of the miniature plunger.

The valve 27 is shut when the desired braking force is low, and it allows much finer and more accurate adjustments of the force applied to the brake at the low end of the working range.

Referring again to FIGS. 1 to 4, a first possible arrangement for biasing the jaws of the brake shoe open is shown. Protrusions 12 on the jaws of the brake shoe assembly 5 pass through elongated holes 13 in the upper plate 7. Springs 14 attached to the protrusions 12 and to fixed protrusions 15 on the upper plate 7 draw the jaws of the brake shoe assembly 5 apart when no other force acts upon them.

Figure 6:
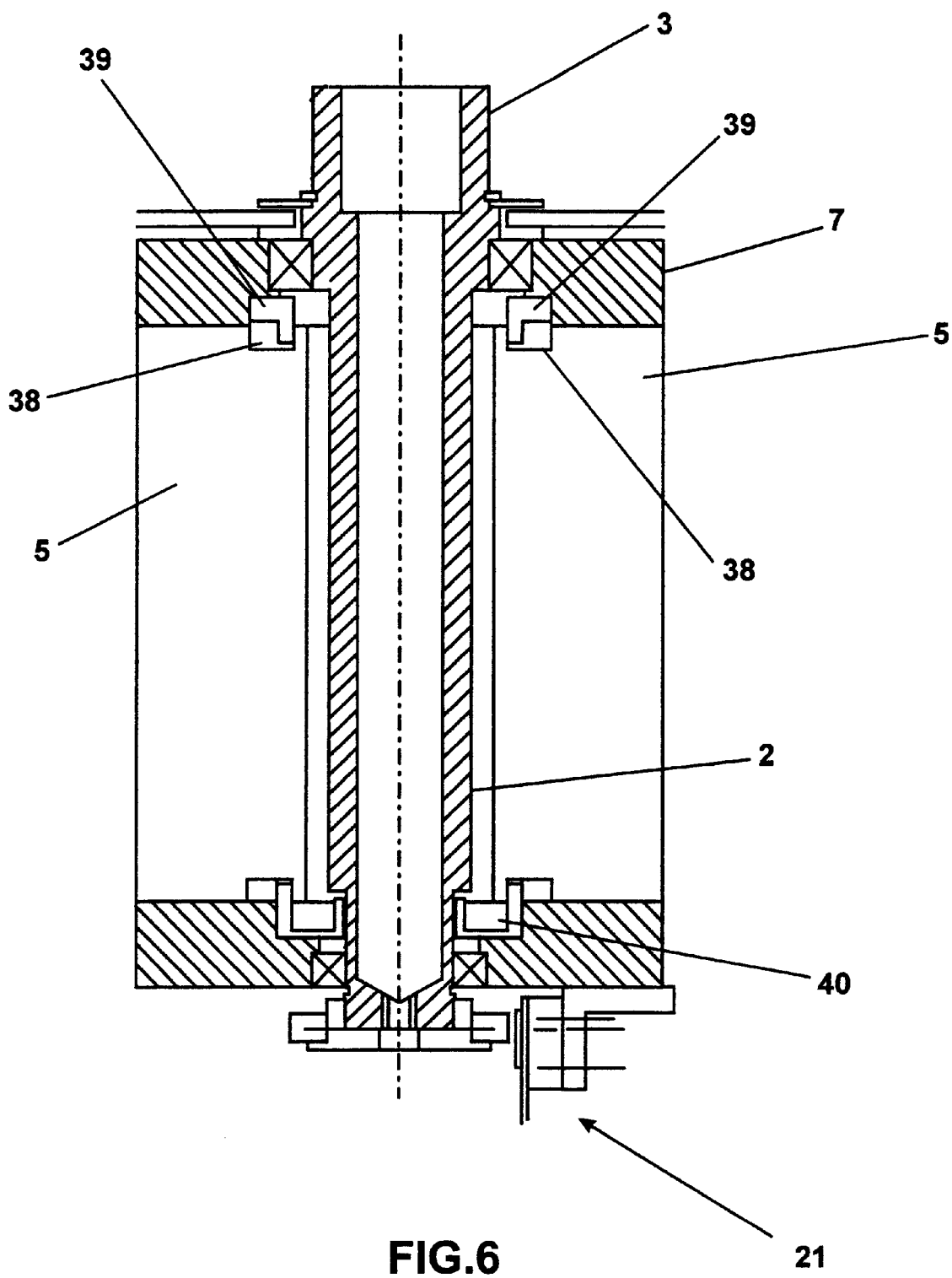
FIG. 6 is a partial axial section through the centre of a brake of a third embodiment of the invention, illustrating an arrangement for returning and centring the brake shoe assembly.

An alternative and preferred arrangement for returning and centring the jaws of the brake shoe assembly is shown in FIG. 6. In this arrangement, the jaws of the brake shoe assembly 5 are pushed apart by a number of springs arranged at regular intervals down the length of the jaws (not visible in this cross section). To ensure that the jaws of the brake shoe assembly are maintained centrally located around the shaft 2, the jaws are provided with recesses 38 into which a centring ring 39 locates. This prevents the springs from pushing one jaw of the brake shoe assembly 5 significantly away from the shaft while allowing the other jaw to remain in contact with the shaft. Also shown in FIG. 6 is a recess 40 which acts as a "dirt catcher". This collects any matter which is ground off the shaft or off the brake shoe assembly as the two are forced into contact. At the base of the shaft, an angle transducer 21 can be seen. This is used during setting up and calibration of the apparatus as will be described below, and measures the angle a through which the shaft 2 rotates during braking.

In the embodiment of FIGS. 1 to 4, a load cell 16 mounted alongside the brake provides the reaction force which prevents the whole brake shoe assembly 5 from twisting when it applies a braking torque to a shaft. The force is transmitted via a reaction plate 17 and reaction arm 18. Measurement of this force can be used to indicate the magnitude of this braking torque T.

Referring to FIG. 1, the outputs τ and α from the load cell 16 and the angle transducer 21 are fed into a controller. Also fed into the controller is a pressure input P obtained from a load cell 20 (FIG. 3) mounted between the plungers 10 and 19 of the piston 11 and the brake shoe assembly 5, or obtained from a measurement of the pressure in a working chamber 30 of the piston assembly shown in FIG. 9, by a pressure transducer 41.

The controller also receives a demand input. The controller controls the pressure applied by the piston to the brake, as described in more detail later.

Figure 5:
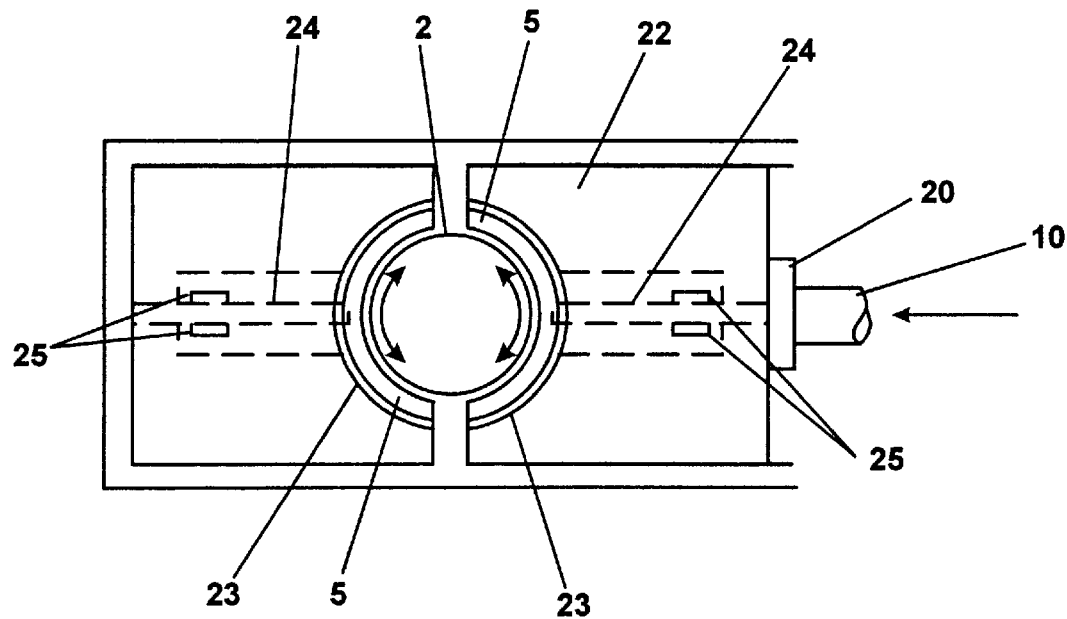
FIG. 5 is a horizontal section similar to that of FIG. 4 but through a brake of a second embodiment of the invention utilizing an alternative torque measurement arrangement to that of FIGS. 2 to 4.

In the embodiment of FIG. 5, the measurement of torque is carried out in an alternative way, which eliminates the effects of the inertia of the assembly. The braking force is applied to the brake shoe assembly 5 via thrust shoes 22 and a bearing 23. The reaction force which converts that thrust to torque passes through a pair of cantilever beams 24 and load cells 25. The bearing 23 allows the transmission of thrust, but not of torque, from the housing to the brake shoe assembly. Thus, the only force preventing the brake shoe assembly from twisting when it applies a braking force to the shaft is the resistance of the two cantilever beams 24 each fitted with two strain gauges 25. The readings of the strain gauges give a direct indication of the torque applied by the brake shoe assembly to the shaft. There is no distortion caused by the inertia of the remainder of the assembly.

FIGS. 8, 9, 10 and 11 show a preferred embodiment of the invention in which a three-stage piston assembly is used to allow the application of high forces as well as low, accurate forces. The piston assembly of FIG. 8 includes a main plunger 10 and miniature plunger 19 as described with reference to FIG. 7.

Figure 8:
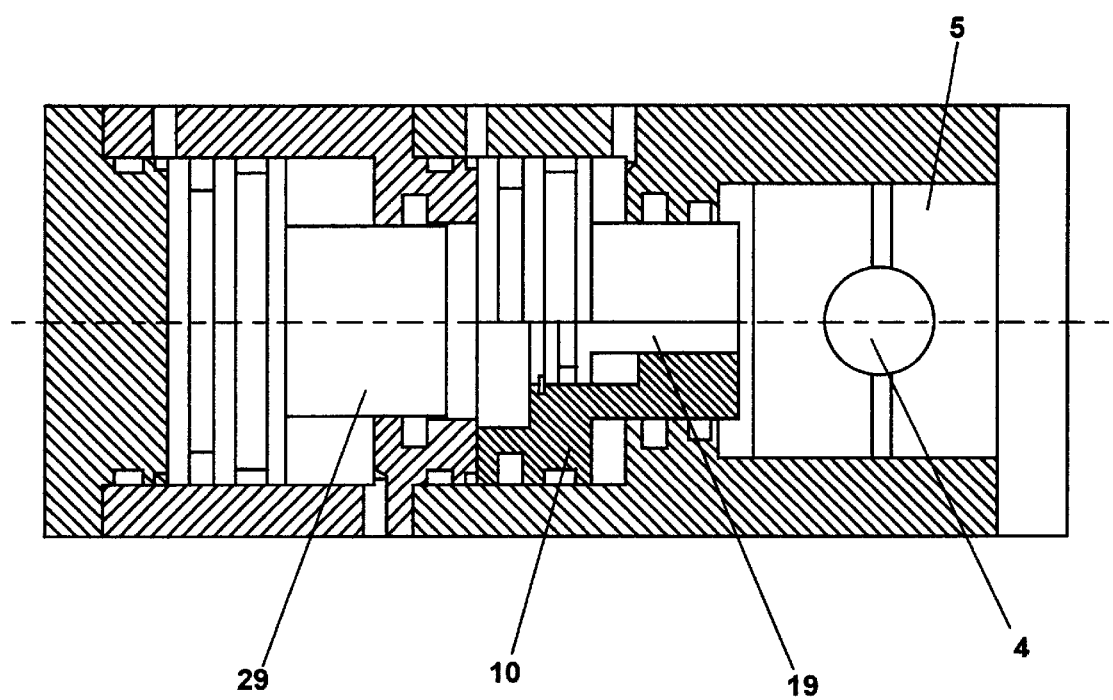
FIG. 8 is a cross section through an alternative piston device for use in a simulated joint according to the invention.

The bottom half of FIG. 8 is cut away to reveal the miniature plunger 19. In addition to the miniature plunger 19 and main plunger 10, this piston assembly includes a booster plunger 29.

Figure 9:
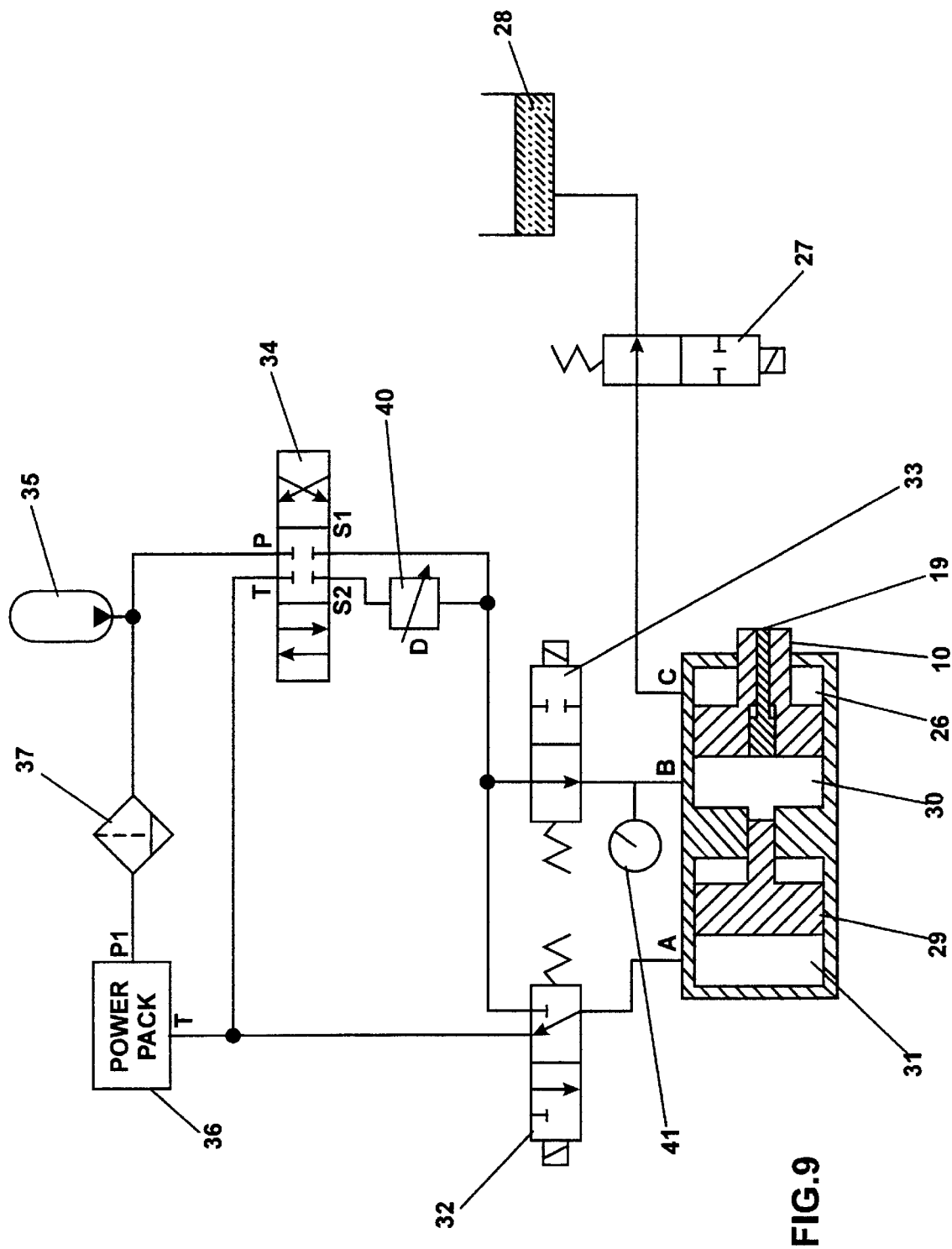
FIG. 9 shows a system layout for the 3-stage piston of FIG. 8 in a simulated joint according to the invention.

The control circuit is shown in FIG. 9 and includes valves 27, 32 and 33, reservoir 28, a controlling servo valve 34, accumulator 35, power pack 36, filter 37, bypass valve 40 and pressure transducer 41.

To apply a pressure via the miniature plunger 19, the valve 27 is shut off and an oil pressure is applied at B to area 30. The main plunger 10 is unable to move, so the miniature plunger is forced to the right in the Figure. The force applied is low, and is easily adjustable at low values.

To apply a pressure through the main plunger 10, the valve 27 is opened and a pressure applied through B to the working chamber 30. In this case the main plunger is moved to the right in the Figure. The force applied is higher for a given pressure, but less controllable at lower forces.

To achieve higher forces, the booster plunger 29 can be used by applying a pressure to a chamber 31 of the piston assembly, allowing no backflow through B, and keeping the valve 27 open.

Figure 10:
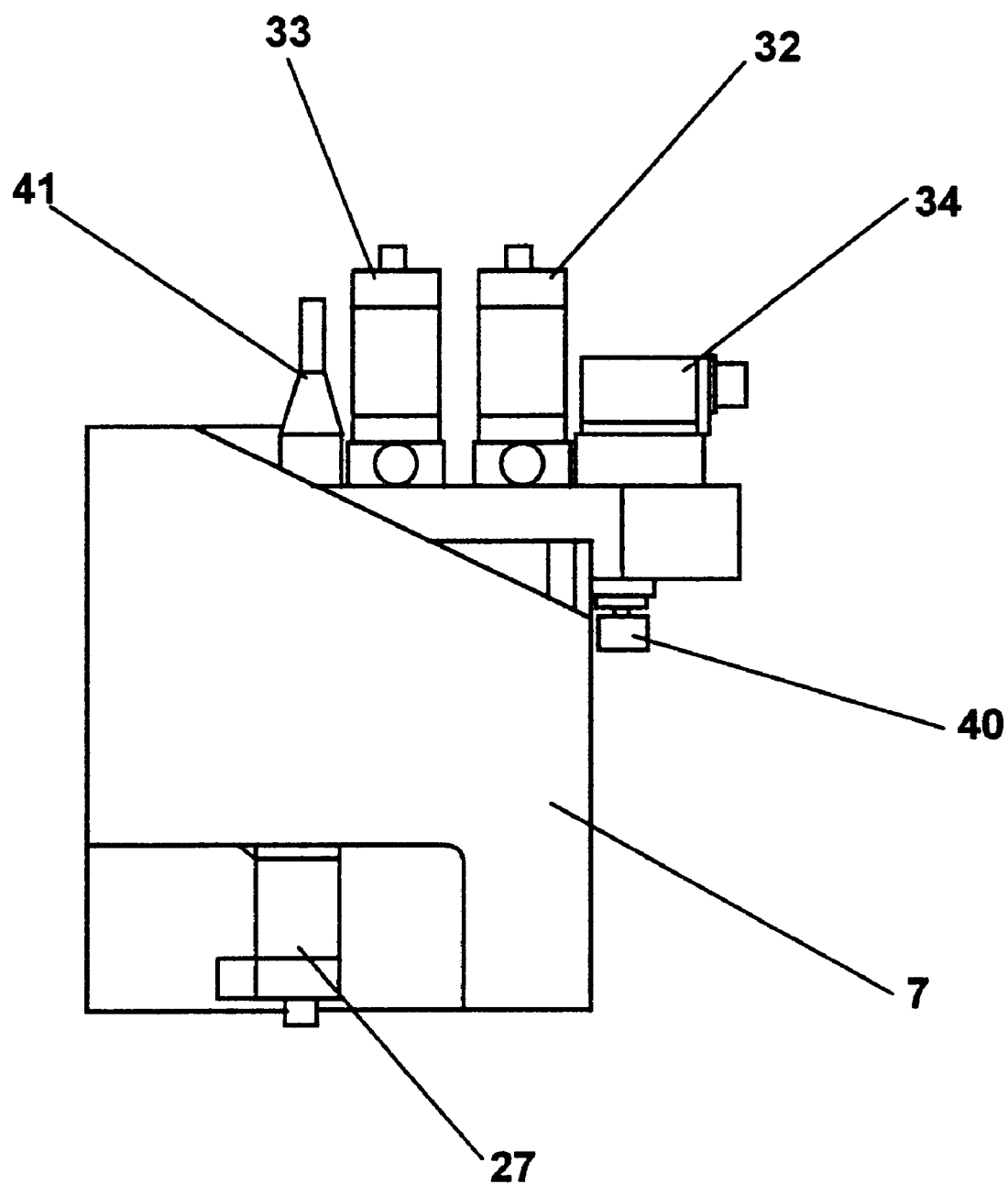
FIG. 10 is a top view of a joint simulator according to the invention using the piston and system layout of FIGS. 8 and 9 respectively.
Figure 11:
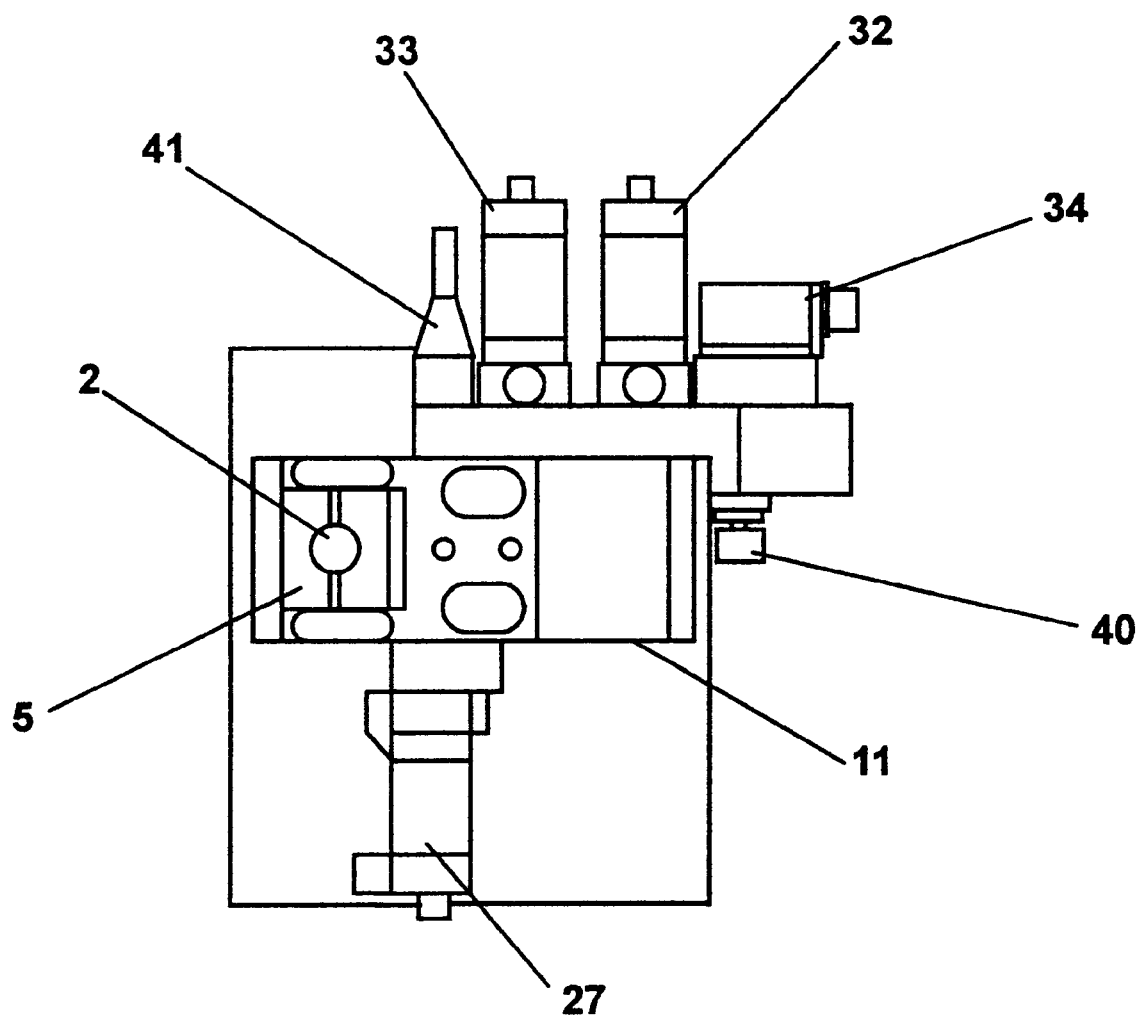
FIG. 11 is a view of the brake of FIG. 10 with its top plate removed.

FIGS. 10 and 11 show a joint simulator which uses the booster plunger and system layout of FIGS. 8 and 9. The valves 27, 32, 33 and 40 and servo valve 34 are shown, attached to the sides of the piston assembly 11, which acts on the brake shoe assembly 5 (FIG. 11). The pressure transducer 41 measures the pressure in the working chamber 30 of the piston 11.

Figure 12:
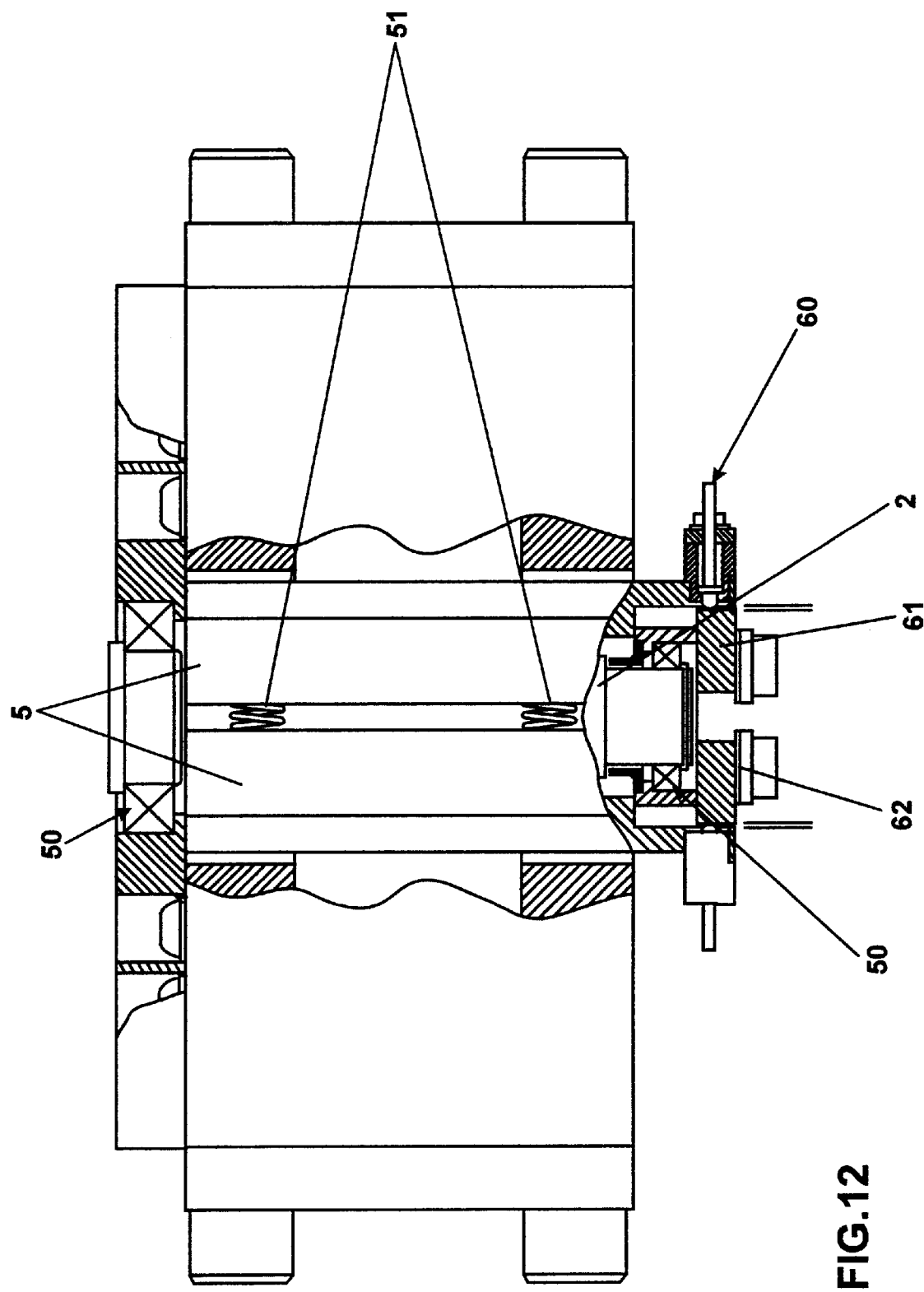
FIG. 12 is a part cut-away side view of a brake used in a joint simulator according to a fourth embodiment of the invention.
Figure 13:
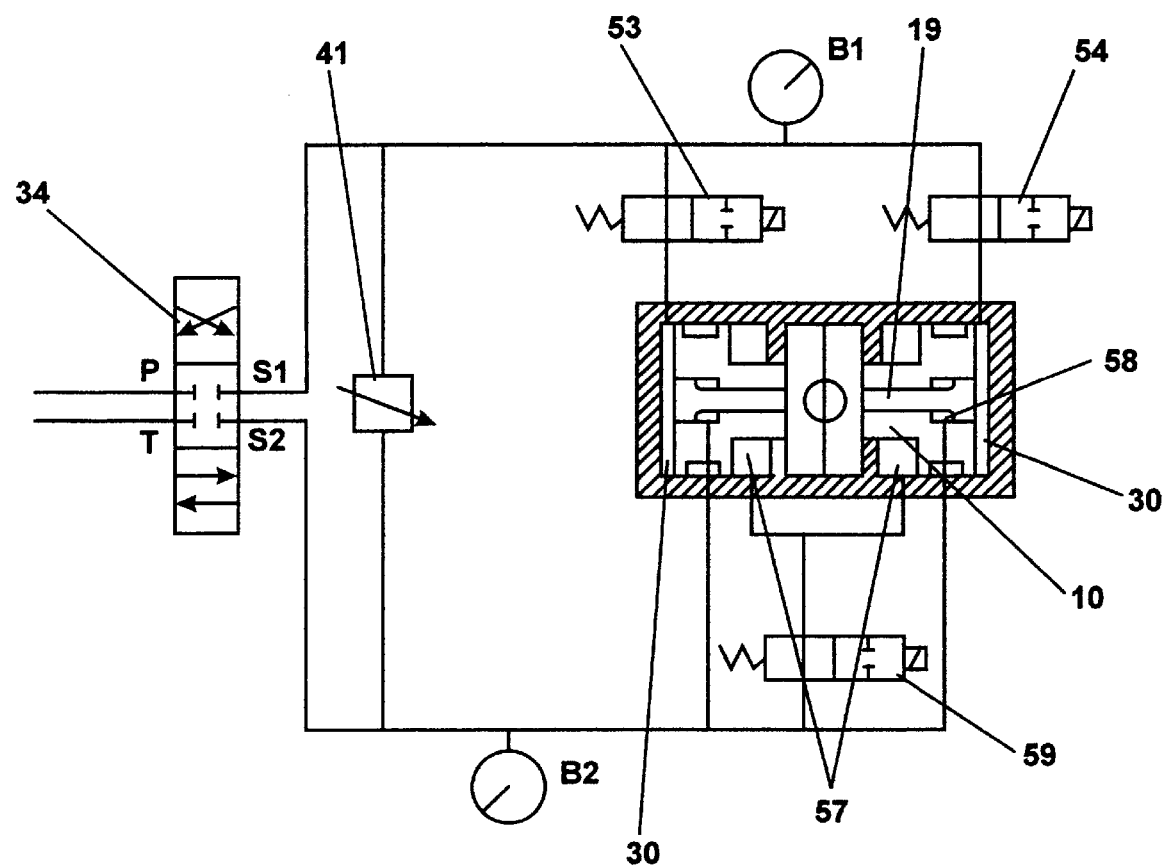
FIG. 13 is a schematic view of the brake of FIG. 14 and the valves which control the operation of the brake.

FIGS. 12 and 13 illustrate a fourth embodiment of the invention. The same reference numerals are used as for the preceding embodiments. Thus the brake includes a shaft 2 mounted for free rotation within bearings 50. The shaft 2 is received within the jaws of a brake shoe assembly 5, which acts directly on the shaft, thereby maintaining the inertia of the rotatable parts as low as possible.

Figure 3:
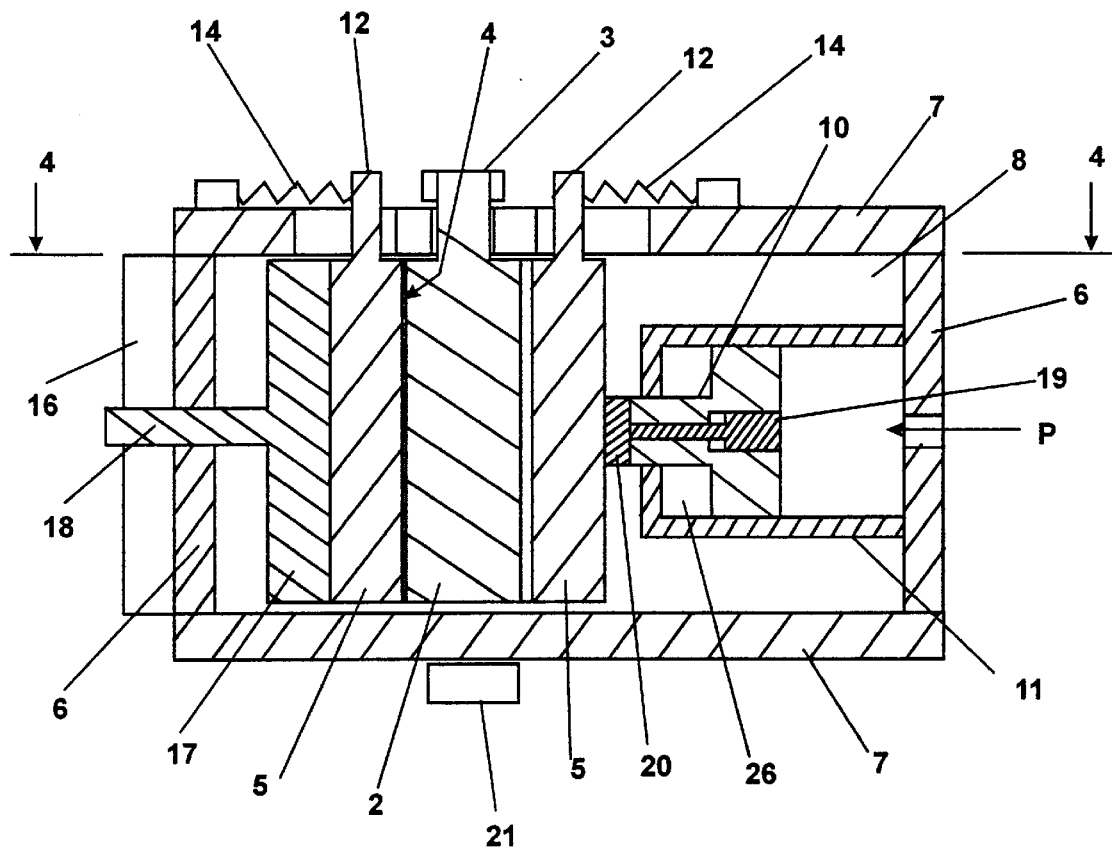
FIG. 3 is a cross section vertically through the centre of the brake of FIG. 2.
Figure 4:
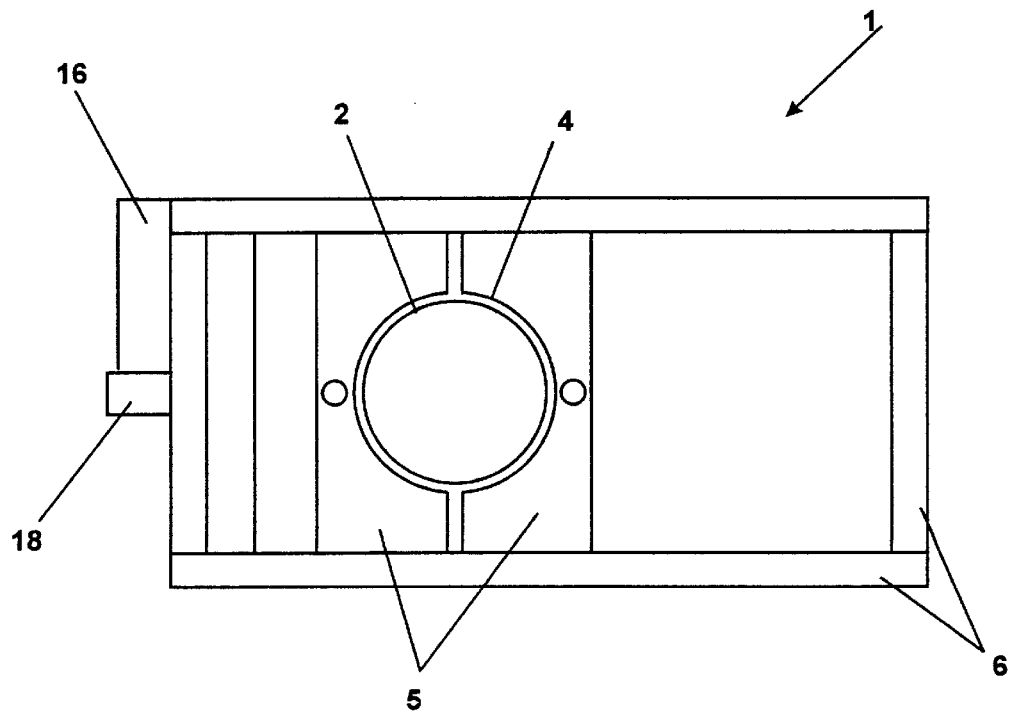
FIG. 4 is a horizontal section along the line 4—4 in FIG. 3.

In contrast to the embodiment of FIGS. 3 to 5, in which only one piston is hydraulically controlled and reaction force alone is used to exert a frictional braking force on the opposite side of the rotary shaft 2, the embodiment of FIGS. 12 and 13 exerts hydraulic control on both jaws of the brake shoe assembly 5, and the piston assembly on each side of the shaft 2 is a double-acting piston assembly. The jaws of the brake shoe assembly 5 are advantageously prevented from sticking together by weak springs 51. However, movement of the jaws both towards and away from the shaft 2 is carried out hydraulically in this embodiment and with suitably accurate control of the hydraulic brake release pressure the springs 51 may be omitted.

Referring in particular to FIG. 13, a servo valve 34 supplies oil via the valves 53 and 54 to working chambers 30, thereby forcing the main plungers 10 or miniature plungers 19 against the jaws of the brake assembly 5. This applies the brake. To release the brake, pressure is applied to chambers 57 and 58, thereby moving the main plungers 10 or miniature plungers 19 away from the shaft 2.

For the particular servo valve illustrated, it is necessary for a tiny amount of oil flow through the servo valve at all times, even when it is effectively closed, to enable it to function. This oil circulates through the bypass valve 41. Alternatively, a servo valve may be used which derives the power to move the spool from a DC actuator. In this case, the bypass valve 41 would not be required.

A valve 59 allows oil to be pushed out of the chambers 57 when the main plunger 10 is working, but prevents oil leaving chamber 57 when the miniature plunger 19 is to be used. This is equivalent to the working of the main and miniature plungers described previously with reference to FIG. 10.

It has been found that the apparatus of FIG. 4 does not always apply torque in an evenly increasing manner at the commencement of torque application. One jaw of the brake shoe assembly 5 may contact the shaft 2 first; the other jaw is pulled into contact with the shaft a short time later. While only one jaw contacts the shaft, there is negligible braking effect as the pressure on the single jaw rises gradually from zero. When the second jaw contacts the shaft, the torque applied to the shaft rises very suddenly.

For relatively large torques, this jump in torque at the commencement of braking has a negligible effect on the overall performance of the test joint. However, for lower torque measurements, it can be important. The problem is overcome as follows.

Referring to FIG. 12, a small probe 60 is attached to each jaw of the brake shoe assembly 5. The probe 60 is arranged such that it makes electrical contact to earth via a block 61 just as the jaw of the brake shoe assembly is about to come into contact with the shaft 2. The plunger 60 is lightly biased away from the block 61. The block 61 is held frictionally by a Belleville washer. Thus, as the brake shoes or the shaft 2 wear, the plunger pushes the block 61 in further towards the centre of the shaft. This permits self recalibration to compensate for wear.

If one jaw of the brake shoe assembly 5 is about to come into contact with the shaft 2 before the other jaw, this is detected via the above described probe arrangement. The appropriate one of the valves 53 and 54 is then closed, to prevent that jaw moving any further and touching the shaft 2. Oil is still allowed to pass through the other of the two valves 53,54 to allow the other jaw of the brake shoe to "catch up". Once this second jaw also reaches a position where it is just about to contact the shaft 2, both valves are opened and increasing pressure is again applied to both jaws of the brake shoe.

The true test run commences at a very low threshold torque δT, which represents the jaws of the brake shoe being just in contact with the shaft.

As explained above, it has been found that when used with pulse tools the inertia of the test joint is even more important than was initially envisaged. In the embodiment shown in FIGS. 1 to 4 of UK Patent Application No. 9618408.0, torque is measured by using a load cell 16 to gauge the reaction force required to prevent the whole brake assembly from twisting when it applies a braking torque to a shaft. This requires some movement of the brake assembly in order to measure the reaction force, although the movement is very small. It has been found that the inertia of the moving parts causes a delay in the measurement of torque. Thus with a pulse tool it appears that the movement of the shaft is out of synchronization with the applied torque. This explains the discrepancy between the top graph of FIG. 13 (an ideal joint) and the heavy line in the middle graph of FIG. 13 (the apparent performance of the joint simulator according to the invention). The above method does not cause a problem for angle nutrunners; only pulse tools are significantly affected.

In the FIG. 5 embodiment torque is measured in an alternative way which reduces the effect of the inertia of the brake assembly. Here the reaction force passes through a pair of cantilever beams 24 and is measured by load cells 25. In this embodiment only the jaws of the brake shoe assembly must move slightly in order for torque to be measured. The effect of the inertia of these brake shoe jaws may not be sufficiently large to cause the above problems.

In the embodiment of FIG. 13, an in-line transducer is used to measure torque directly on the shaft. The brake shoe assembly is held solidly within the housing. Although this increases the moment of inertia of the shaft very slightly, it avoids the delay in torque measurement which occurred with the previous embodiments due to the inertia of the brake shoe arrangement/housing.

A test joint according to the invention is able to reproduce very closely the inertia of higher torque fasteners. For lower torque fasteners, the inertia can be kept within an order of magnitude of an appropriate fastener inertia. This level of performance can be achieved by keeping the number of moving parts to an absolute minimum.

Fasteners are classified according to their torque capacities. For example an M4 fastener might be capable of being tightened to torques of up to 2 Nm, while an M14 fastener can withstand torques of up to 400 Nm. of course an M14 fastener is much bigger than an M2 fastener and has a much greater inertia. The inertia of an entire fastener system can be quantified. It has been found that for the highest torque ranges to be simulated, the booster piston 29 of FIG. 9 is not necessary in this fourth embodiment of the invention. The necessary torque range can be obtained by simply switching to a higher pressure operating range of the hydraulic pump supplying the control valve 34—for example switching from a maximum pump pressure of 50 Bar to 100 Bar.

Use of the Simulated Joint

In general, the simulated joint mimics the performance of an ideal joint as defined in ISO 5393. According to this standard, if applied torque is plotted against angular displacement, the resulting curve must be a straight line from 5% to 100% of the test torque level. The gradient of the line depends upon the torque rate of the test joint, and somewhat more deviation from the ideal straight line is permitted for a low torque-rate joint than for a high torque-rate joint.

To test a tool using the simulated joint, an operator brings the tool into engagement with the input drive 3 (FIG. 3) in the same way as it would be brought into engagement with a bolt to be tightened. The tool is then allowed to turn the shaft 2 (FIG. 4) via the bolt head 3 freely under no-load conditions for a moment. This mimics the turning of a joint before tightening commences. Subsequently the servo controller sends signals to the servo valve to operate the piston 11 and activate the brake. The force applied by the brake is increased with time in a manner discussed in more detail below, until a maximum test torque is reached. To comply with ISO 5393, the increase in torque with angular displacement of the shaft should follow a straight line between certain maximum and minimum values.

Calibration of the Simulated Joint

Before the simulated joint can be used to test a power tool, it is necessary to establish as a characteristic of the simulated joint the relationship between the pressure applied to the brake via the piston and the braking torque applied to the shaft.

The calibration process is carried out by placing a "reference" in-line torque and angle transducer on the input drive 3 and driving the brake through it with a suitably rated non-impulse tool. The shaft is then locked into place by applying a high pressure continuously to the brake. This should be in excess of the pressure required to produce the maximum torque value of the range to be calibrated. For example if the in-line transducer is to be calibrated for the range of 0–50 Nm, a pressure would be applied which enabled the brake to resist a torque of 60 Nm.

A tool is used to apply a torque to the shaft via an external torque transducer such as a CHECKSTAR (Trade Mark). The first torque applied is, for example, 20% of the maximum calibration torque, ie 10 Nm in our example. An operator therefore uses the tool to apply a torque of 10 Nm. The CHECKSTAR torque output is fed into the controller of the simulated test joint. The output of the in-line transducer of the test joint is also fed into the controller. The two readings are compared to calibrate the in-line transducer.

It is important that for each torque value, a number of consistent readings are obtained. It is not crucial that the readings are exactly 20%, 40%, etc of the maximum torque, but to obtain a successful calibration the five readings should be the same. A system of lights is used to help an operator achieve this. The operator applies the tool which is simple lever torque wrench to the shaft and "pulls" on the tool to generate torque. It is important that the operator has a simple feedback to tell him/her when the required torque level is "close". Thus, when no torque is being applied, an orange light flashes slowly. As the applied torque gets nearer to the desired torque, the frequency of the flashing increases. When the torque is at the required level for long enough for the machine to have satisfactorily sampled it, the green light will show to indicate success. If the operator is too quick and the sample fails, the red light will show and that step of the calibration process will have to be repeated. Readings are taken at, for example, 20%, 40%, 60%, 80% and 100% of the maximum torque to be calibrated.

In this way the in-line transducer can be calibrated without moving the shaft at all.

It is necessary to run the calibration at regular intervals to ensure that the relationship between applied pressure and torque does not change. Such change could be caused by the variability of internal friction loadings within the piston and/or the brake shoes/shaft.

Figure 2:
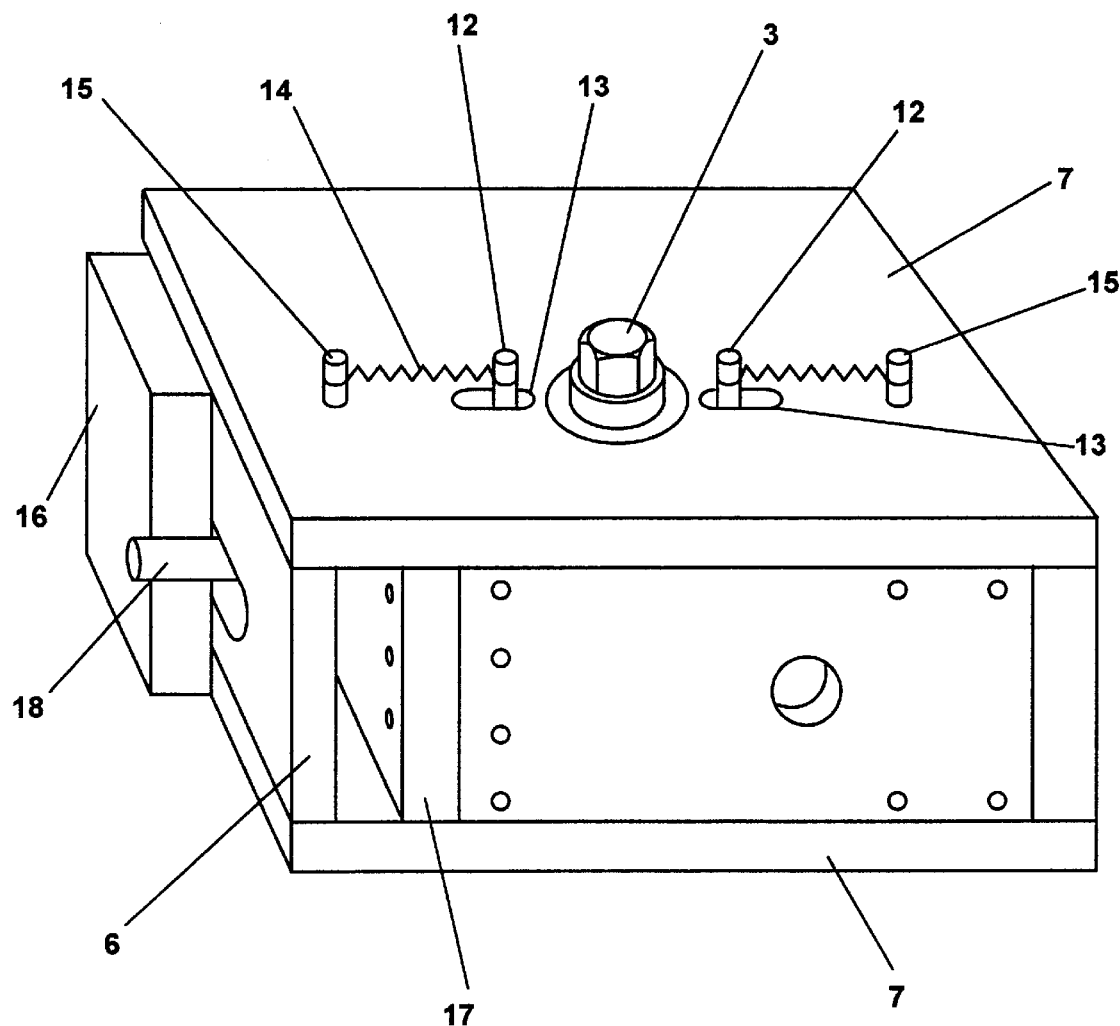
FIG. 2 is a perspective view of a brake used in a first embodiment of a joint simulator according to the invention.

Instead of using pressure as an analogue, torque may always be measured directly by measuring the force on the load cell 16 in the embodiment of FIGS. 2–4. There is concern that at the lower end of the brake's operating range the sensitivity and accuracy could be reduced. This is because the hydraulic feed to the piston has to be made through a hose which, whilst flexible, exerts a force on the brake which may mask the effect of low torque. Further, at high torques, the deflection of the load cell itself may become significant and this, coupled with the relatively high mass of the brake, will tend to have a damping effect on high torque, low duration pulses. The FIG. 5 embodiment, in which the force in the strain gauges 25 is measured, overcomes this problem.

Once the brake has been calibrated, it can be used to test a tool. When a test run is initiated, the operator is required to state:

(a) the expected maximum performance of the tool;
(b) the ISO curve required (hard or soft);
(c) whether or not the tool is a pulse tool;
(d) a reference number or code which could be used for future recall; and
(e) the required sample size.

Non-Pulse Tools

A "learning run" then takes place, as follows: The tool is connected to the brake so that it engages the input drive and the operator is instructed to hold the throttle open either until the tool's internal clutch or shut-off mechanism stops the tool or until the brake detects a stall condition.

While the tool is held in engagement with the input drive of the brake, the shaft is initially allowed to run freely as if the joint had not yet started to engage. The tool's no-load speed is measured and recorded. The controller then operates the servo valve to apply a pressure via the piston to the brake. The first pressure applied will be, for example, that which will cause the brake to apply 10% of the expected maximum torque of the tool. This pressure is known because of the pressure/torque calibration carried out previously. The pressure will then be increased in approximately 10% increments until the tool stops rotating. The time over which the increments are made depends on an initial rough estimate of what torque/time curve will give the desired torque/angle curve. At each step the controller registers the torque applied, the angle moved through and the elapsed time and stores the values in the display and data collection means. Measurements of power output, speed, etc can also be taken for future reference.

The controller knows the desired relationship between torque and angle from the required ISO curve. Following the learning run, it also has complete torque, time and angle data for the particular tool. The controller can therefore calculate how it should modify <u>torque</u> with <u>time</u> in order to achieve the correct torque/angle curve. The torque/time relationship will be represented by a curved line in order to give the desired straight line relationship between torque and angle. A steep torque/time curve will mimic a hard joint and a shallow torque/time curve a soft joint.

Once the learning run has been performed a series of "test runs" follows:

The brake is run for several cycles according to the calculated torque/time curve and for each cycle values of torque and/or pressure and angle moved are recorded in a temporary database. The measurement of angle starts once the torque reaches some specified percentage of the maximum expected torque, for example 1%. At the end of these cycles, the database is interrogated to check whether the torque/time readings fall within ISO tolerances. If not, the torque/time curve is recalculated, the previous set of results discarded and the operator instructed to repeat the tests.

Any <u>measurement</u> of angle or torque taken during the run would <u>not</u> change the torque/angle curve taken <u>during</u> the run, and therefore during the test cycle the torque and angle sensors could be removed.

Pulse Tools

If the operator states that the tool is a pulse tool, the learning and test cycles are carried out somewhat differently.

If a pulse tool is used to tighten a theoretical ISO 5090 joint, the torque/angle characteristic should be approximately a straight line as shown in FIG. 12. Referring to the FIG, it can be seen that a first pulse starts the tightening of the joint by moving it through an angle $\alpha_1$. The torque rises from 0 to $\tau_1$ during the pulse. A second pulse then moves the joint through an angle $\alpha_2$ and increases the torque from $\tau_1$ to $\tau_2$, and so on, until a torque $\tau_5$ is reached, which causes no further angular movement. This represents the maximum capacity of the tool.

The work done by each pulse of the tool tends to be about the same; therefore the areas under the torque/angle graphs are approximately the same for each pulse.

Figure 14:
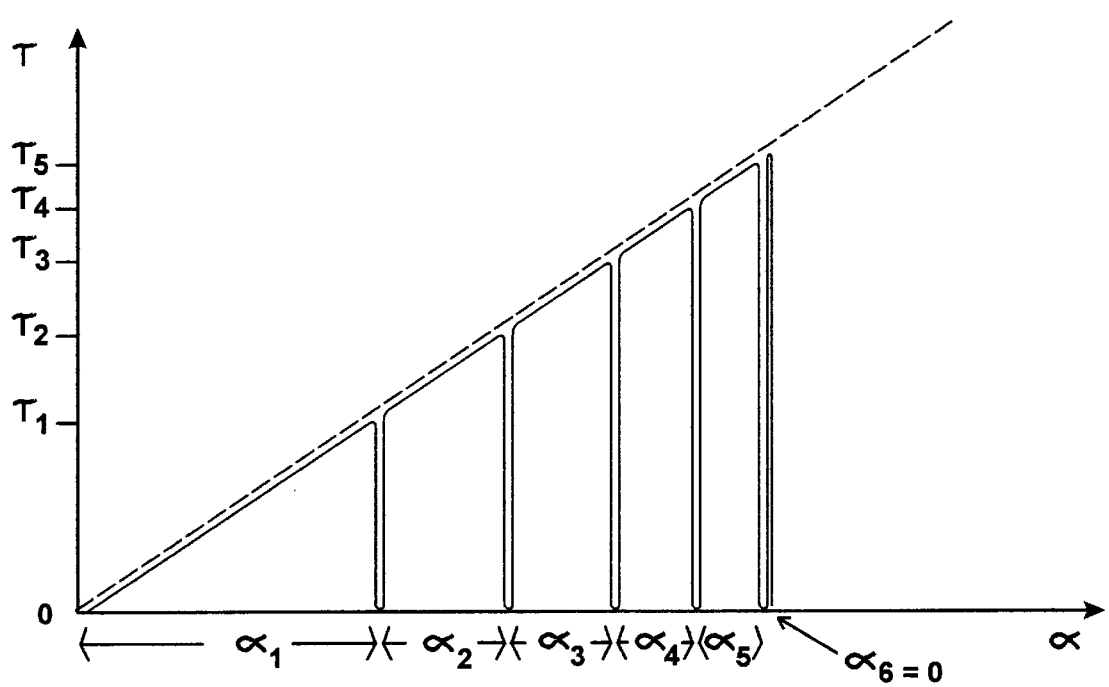
FIG. 14 is a plot of torque against angle for a pulse tool applying torque to an idealized joint.

The graph of FIG. 14 assumes that the inertia of the rotating part is negligible. If it had significant inertia, there would be further angular movement once a pulse had ceased. It can be seen that for a simulated joint to mimic the performance of an ideal joint when testing pulse tools, its inertia must be very low.

Figure 15:
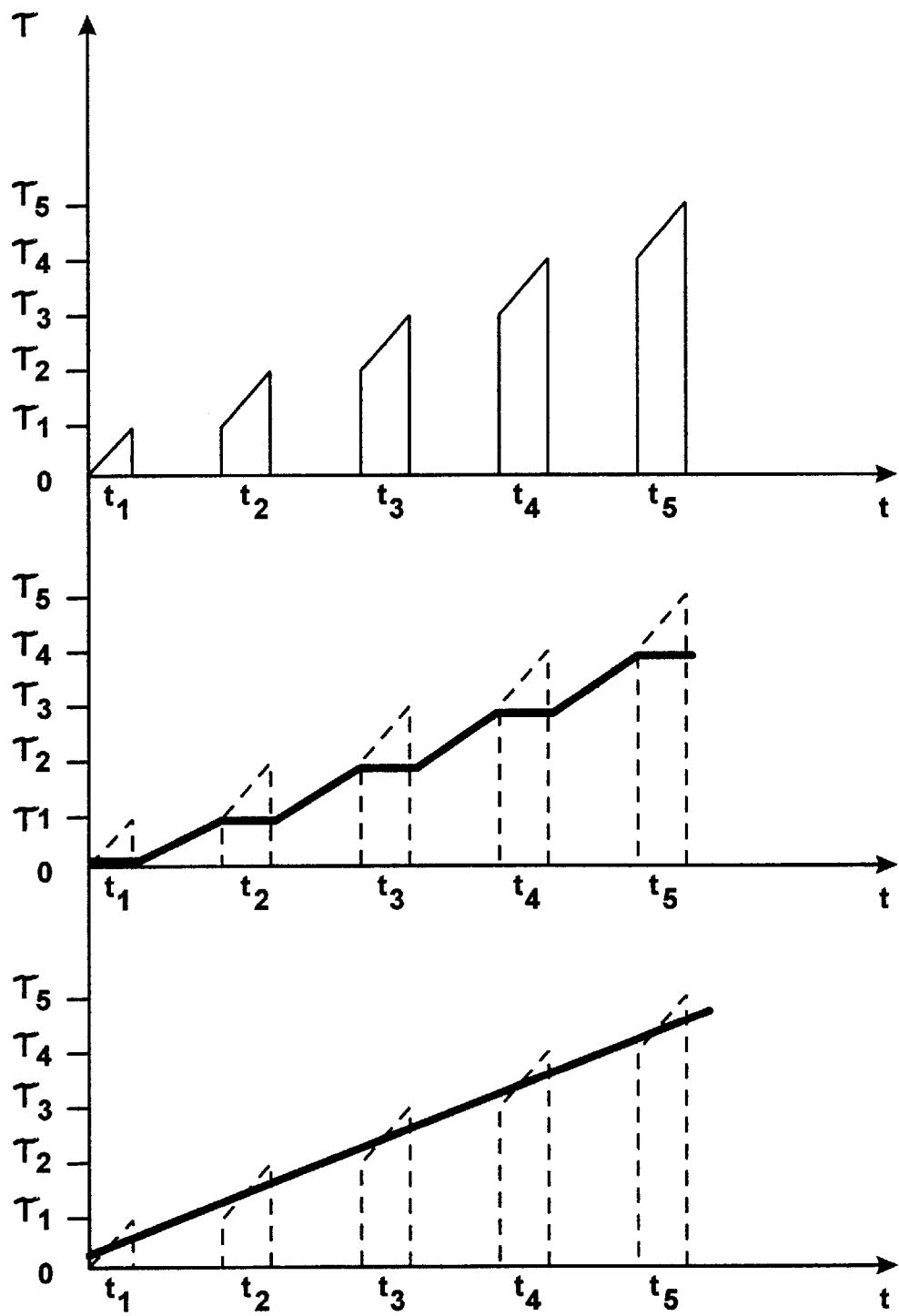
FIG. 15 is a plot of torque against time for a pulse tool applying torque to an idealized joint.

FIG. 15 is a 3-part graph showing the relationship between torque $\tau$ and time t in a simulated joint according to the invention when used with a pulse tool. The top portion of the graph illustrates an expected (idealized and theoretical) relationship between torque $\tau$ and time t if torque increases are split up into discrete elements separated by the time between pulses. That theoretical relationship is repeated for reference purposes in the lower two portions of FIG. 15, to illustrate how the time between pulses is important in a simulated joint according to the invention which uses a torque/time relationship.

The Learning Run

The tool is allowed to accelerate the shaft for a moment and any torque pulses during this period are ignored. The controller calculates a very approximate torque/time curve which will definitely stop the tool. To be safe, the maximum value of torque could be set at perhaps 125% of the maximum expected torque. The brake is then operated according to this torque/time curve and torque, time, and angle readings taken.

The apparatus deals with the pulsing of the tool as follows. When the torque exerted by the brake reaches a predefined threshold level (for example 1% of the expected maximum torque) this represents the start of a pulse and the apparatus begins to measure the torque and angular movement of the brake shaft. It continues to measure angle and torque until the torque falls below the threshold and remains there for a short pre-set period, (i.e. the end of the pulse is reached). The short period may be, for instance, 5 milliseconds. The memory can then be interrogated to provide the peak torque value and the angle measured between threshold crossings. The exact durations of the pulses and times between pulses can also be measured.

Once this learning run has been carried out, the apparatus "knows" how long the pulses last, and the relationships between torque angle and time within the pulses. A series of test runs may then commence.

The Test Runs

The simulated joint according to the invention is very versatile and can carry out different types of test run depending on the type of tool, the accuracy/repeatability required.

To mimic an ideal joint as closely as possible, the test joint can keep braking torque constant while pulses are applied, and increase braking torque only in the gaps between pulses. Such an applied torque/time curve would be the solid bold line relationship between torque and time as shown in the central portion of FIG. 13.

Alternatively, braking torque can be increased gradually with time so as to correspond to the solid bold straight line passing through the pulses in the bottom portion of FIG. 15. This has been found to give repeatable results which correspond closely to the ISO 5393 standard.

Figure 16:
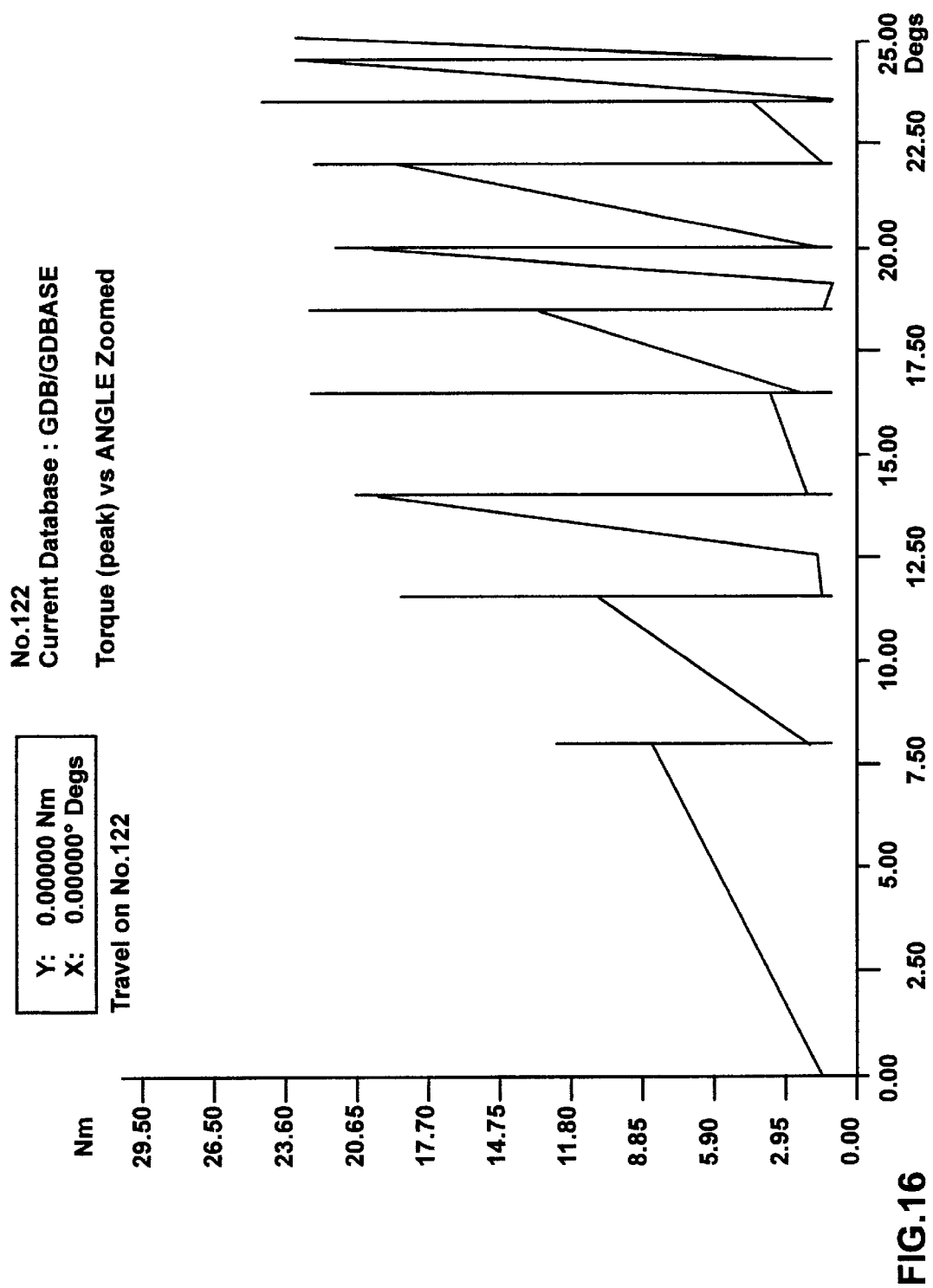
FIG. 16 shows a plot of torque against angle for a pulse tool, when the simulated joint is mimicking a soft joint

FIG. 16 shows a plot of torque against angle for a pulse tool, when the simulated joint is mimicking a soft joint.

Mapping of Joints

An extremely important technique which can be carried out using a test joint according to the invention is the "mapping" of real joints. This allows the test joint to mimic very closely and consistently the performance of a real joint.

Figure 17:
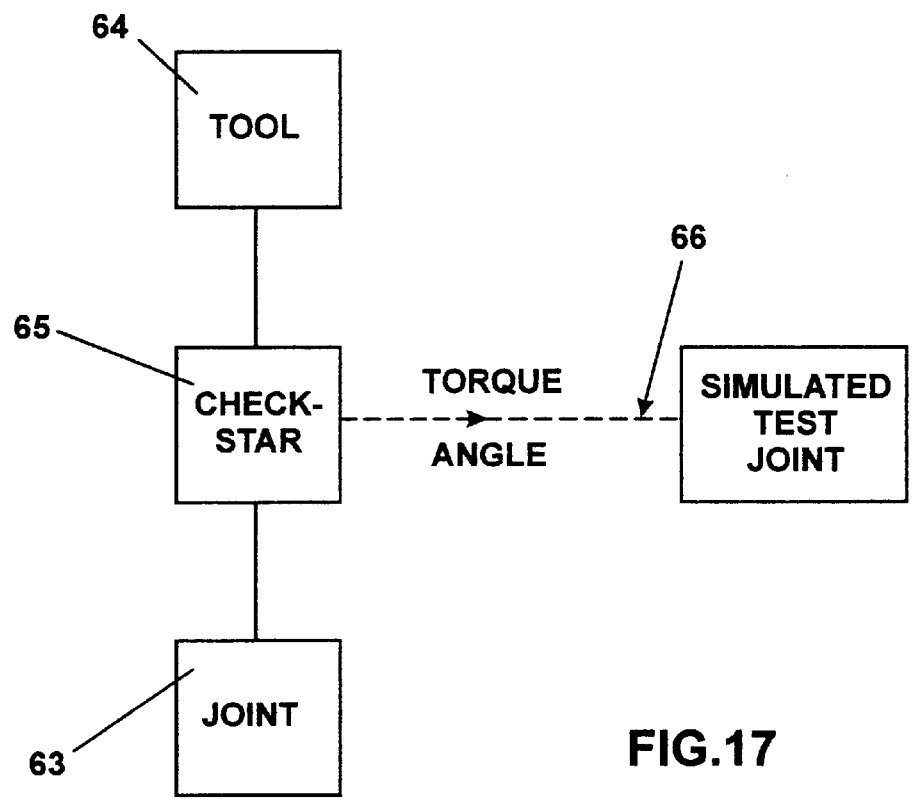
FIGS. 17 and 18 are diagrams to illustrate joint mapping.
Figure 18:
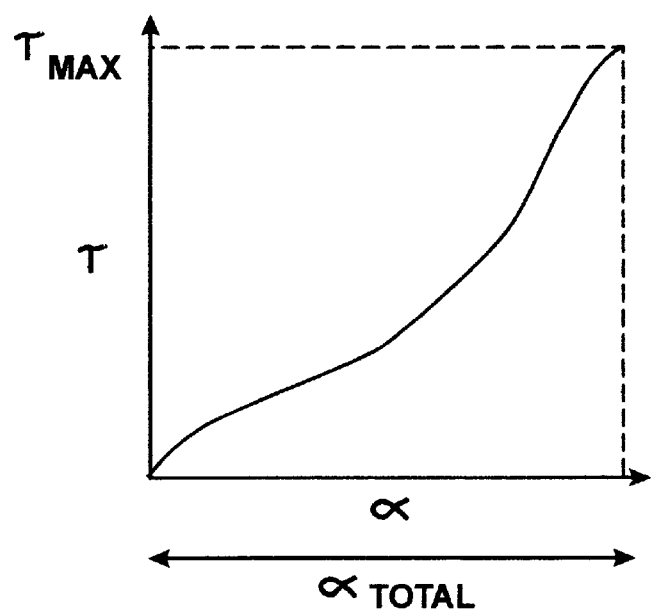

Referring to FIG. 17, a joint 63 is tightened using a tool 64. A torque and angle measurement device, or CHECKSTAR (Trade Mark) 65 is inserted between the tool and the joint, and has its outputs fed into the simulated test joint's controller as represented in FIG. 17 by the broken line 66. The controller records values of time, torque and angle as the tool 64 is used to tighten the joint 63. Thus, the information shown in FIG. 18 is fed into the controller, along with information as to the time at which each reading is taken. The shape of the graph illustrated in FIG. 18 is not necessarily representative of every typical joint. The simulated test joint can then calculate approximately the torque/time characteristic that it should produce in order to mimic the same torque/angle characteristic as the real joint displayed. A number of learning runs can be performed as previously described, allowing the optimum torque/time curve to be arrived at.

Theoretically, a straight torque/angle relationship is produced by a curved torque/time graph. The curve of a real joint is likely to be a complex shape. However, reproducible and accurate results can be achieved even using a straight line relationship between torque and time, as follows. Referring to FIG. 18, the maximum torque achieved τMAX, and the total angle moved through, αTOTAL, are measured. The controller of the simulated test joint then calculates an approximate straight line torque/time characteristic which will result in the shaft moving through an angle of approximately αTOTAL with the maximum torque applied being τMAX. If the angle moved through is too large or too small, a further learning run is carried out using an appropriately modified torque/time characteristic. Repeated learning runs allow the simulated test joint to gradually "home in" on the desired torque angle relationship.

Although good results can be obtained by approximating the torque/time curve to a straight line, it is possible for the simulated test joint to mimic a real joint more accurately. A complex curve may be broken up into sections and analysed using successive approximation and/or "best fit" techniques. The simulated test joint can then apply on appropriate torque/time curve to mimic the real joint very accurately.

The above method allows the simulated test joint to reproduce accurately and consistently the characteristics of a particular joint. The controller carries out all the necessary calculations, making the procedure easy for an operator.

Because the joint controls torque with regard to time rather than angle, no feedback is necessary during testing. When very hard joints are mapped—equivalent to ISO 5393, or even harder—it has been observed that the elapsed time from threshold to full torque for the tools on test can be around 3 to 5 milliseconds. This is for tools running at normal speeds in the range of 30 to 75 Nm. It is possible to generate a smooth change in braking effect in the torque range stated and within the total times observed. It would be impossible to continuously adjust the torque incrementally at such speeds, and no system relying on feedback during testing could possibly react quickly enough to produce consistent results.

What is claimed is:

1. A variable rate test joint comprising:
    a housing;
    a shaft mounted within the housing;
    means for coupling a tool to be tested to the shaft; and
    brake means for applying a braking torque to the shaft;
    wherein the brake means comprises
        a brake shoe assembly actuable by electrohydraulic or electropneumatic means and being arranged to act in use directly on the outer cylindrical surface of the shaft to apply a frictional braking torque thereto; and
        a computer for controlling the pressure applied to the electrohydraulic or electropneumatic means as a function of time, being arranged to vary in use the applied pressure from a preset threshold to a maximum value over a time period which is variable to reflect the hardness of the joint being simulated.

2. A variable rate test joint according to claim 1, further including means for measuring the braking torque (τ) applied to the shaft and the angle (α) through which the shaft rotates.

3. A variable rate test joint according to claim 2, wherein the means for measuring the braking torque (τ) applied to the shaft includes a load cell for measuring the reaction force on the housing.

4. A variable rate test joint according to claim 1, wherein the shaft carries no rotary parts, apart from support bearings at its opposite ends, of a greater diameter than the shaft diameter acted upon by the brake shoe assembly.

5. A variable rate test joint according to claim 4, wherein the brake shoe assembly comprises first and second brake shoes acting on opposite sides of the shaft under the control of independently variable electrohydraulic pressures.

6. A variable rate test joint according to claim 5, wherein the brake shoe assembly is mounted in the housing in a thrust bearing.

7. A variable rate test joint according to claim 6, wherein rotation of the brake shoe assembly is prevented by one or more cantilever beams, and the beams are provided with strain gauges for measuring the reaction torque on the brake shoe assembly and thereby the torque applied to the shaft.

8. A variable rate test joint according to claim 7, wherein means are provided for biasing the brake shoe assembly away from contact with the shaft.

9. A variable rate test joint according to claim 8, wherein the means for biasing the brake shoe assembly away from contact with the shaft comprises double-acting piston means for applying and releasing the frictional braking torque.

10. A variable rate test joint according to claim 1, wherein the brake means for applying the braking torque to the shaft includes a piston assembly having more than one plunger, the plungers having different thrust areas.

11. A variable rate test joint according to claim 1, wherein the shaft has a moment of inertia of less than $10^{-4}$ kg/m$^2$.

12. A variable rate test joint according to claim 11, wherein the shaft is provided with a range of alternative coupling heads having different moments of inertia, so that by changing the coupling heads the moment of inertia of the combination of shaft and coupling head can be varied to approximate that of a fastener being simulated by the joint.

13. A method for testing torque application tools, the method including the steps of:

coupling the tool to a shaft;

applying a frictional braking torque to the shaft by the direct frictional contact of an electrohydraulically or electropneumatically actuable brake shoe assembly on the outer cylindrical surface of the shaft; and controlling the magnitude of the hydraulic or pneumatic control pressure acting on the brake shoe assembly to generate the frictional braking torque, using a computer to raise the applied control pressure as a function of time from an initial threshold pressure to a maximum value over a time period which has been preselected to reflect the hardness of the joint being simulated.

14. A method according to claim 13, wherein a preliminary calibration run is carried out to ascertain the relationship between pressure applied to the electrohydraulic or electropneumatic means and the torque applied to the shaft.

15. A method according to claim 13, wherein the testing of a tool commences with a learning run during which the way in which the tool performs is monitored, by recording the angle moved by the shaft for a range of torques applied at predetermined times.

16. A method according to claim 15, wherein a desired torque/angle relationship is fed into the computer, which uses the data from the learning run to calculate the increase of control pressure with time which will result in the desired relationship between torque and angle.

17. A method according to claim 15, wherein the learning run is followed by test runs during which the control pressure is increased as a function of time in a way which has been calculated to result in the desired relationship between torque and angle.

18. A method according to claim 17, wherein data from each test run is analysed and compared with the desired torque/angle curve, and the control pressure/time function adjusted if necessary.

* * * * *